April 21, 1953 W. V. HEEKIN 2,635,566
FERTILIZING GARDEN TOOL

Filed Nov. 3, 1950 2 SHEETS—SHEET 1

INVENTOR.
Walter V. Heekin
BY
Murray, Sackhoff & Murray
ATT'YS

April 21, 1953  W. V. HEEKIN  2,635,566
FERTILIZING GARDEN TOOL

Filed Nov. 3, 1950  2 SHEETS—SHEET 2

INVENTOR.
Walter V. Heekin
BY
Murray, Sackhoff & Murray
ATT'YS

Patented Apr. 21, 1953

2,635,566

UNITED STATES PATENT OFFICE 2,635,566

FERTILIZING GARDEN TOOL

Walter V. Heekin, Mariemont, Ohio

Application November 3, 1950, Serial No. 193,881

3 Claims. (Cl. 111—1)

This invention relates to a fertilizing implement for plant husbandry and is particularly directed to a portable manually operated garden tool capable of placing fertilizer beneath the surface of the earth around a plant.

It is an object of the present invention to provide an implement of the character described that is capable of plowing a number of spaced furrows in the earth around a plant, depositing a measured quantity of a mulch-type fertilizer in the bottom of each furrow and then raking the plowed earth back into each furrow to cover the fertilizer deposited therein.

Another object of the invention is the provision of an extremely simplified implement of novel construction which will deposit fertilizer beneath the surface of the earth around a plant in a single and quickly executed operation.

A still further object of the invention is to provide an implement that forms a fertilizer receiving furrow in the earth without compacting the earth around it and which rakes the soil back into the furrow after the fertilizer has been deposited therein.

Another object of the invention is to provide in a fertilizing implement having the foregoing characteristics a substantially wide and unobstructed opening at the center thereof so that its user will have perfect visibility therethrough, whilst in the act of placing the implement around a plant preparatory to carrying out the fertilizing step therewith.

Other objects of the invention will be apparent from the following specification and the accompanying drawings which illustrate a preferred embodiment of my invention, it being understood that my invention is not limited to the specific structure disclosed therein except as set forth in the appended claims.

In the drawings wherein like reference numerals indicate similar parts throughout the following several views.

Figure 1:
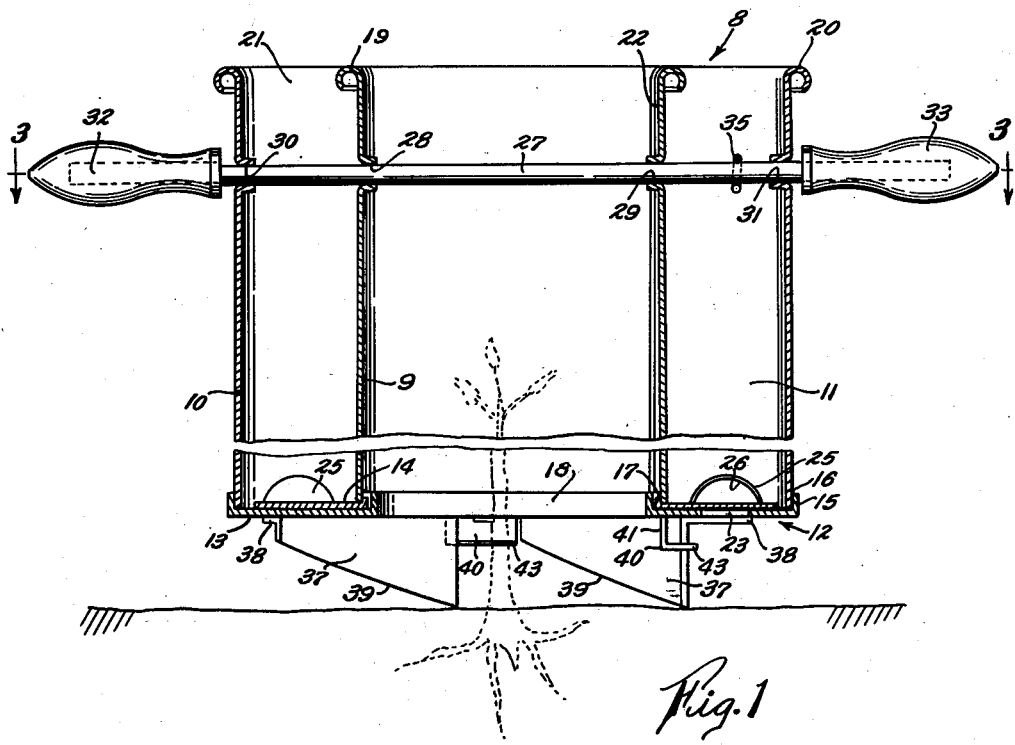
Fig. 1 is a cross-sectional view of my plant fertilizing implement taken through the longitudinal center thereof.

Referring to the drawings in detail the numeral 8 indicates a fertilizer hopper for my garden implement which has an inner tubular member 9 and a relatively rotatable, outer tubular member 10, both preferably having a cylindrical shape and positioned in concentric relationship on a common vertically disposed axis.

The members 9 and 10 are spaced from each other to form a circular fertilizer compartment 11 between them, and, as most clearly illustrated in Fig. 1, a hopper bottom 12 is provided by an inwardly extending ring-shaped plate 13 secured to the member 10 and an outwardly extending, annular plate 14 carried by the inner member 9 and disposed in overlapping relationship with the plate 13. The lowermost plate 13 for the hopper bottom 12 has an upturned annular flange 15 formed around its outer edge for receiving the lower edge of the outer member 10, said plate and member being secured together at their connection by a solder joint 16, or the like. The plate 14 has an inner, annular flange 17 that receives and is soldered to the lower edge of the member 9, the lower plate 13 also having an inner annular flange 18 which serves as a lower guide for the plates when the tubular members are relatively rotated.

The tubular members 9 and 10 may have rolled upper edges 19 and 20 respectively for strengthening purposes and it will be noted that the hopper has an annular opening 21 at its upper end for charging the hopper with fertilizer. The center of the hopper has a through opening 22 the lower end of which is adapted to receive a plant to be fertilized whilst its upper portion affords a sight opening for the operator to properly place the implement around said plant. The tubular members and their associated plates may be made of sheet metal that is provided with a protective coating to guard it against the chemical action of the fertilizer, and to this end, I contemplate tin plating, galvanizing, or lacquering the surfaces of the implement parts which come in contact with the fertilizer.

Figure 2:
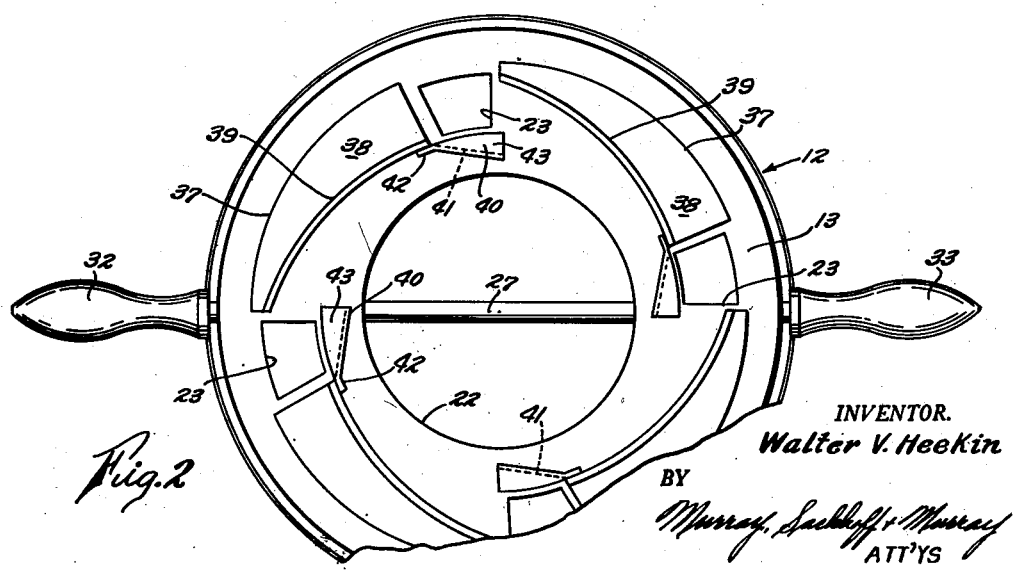
Fig. 2 is a bottom plan view of the implement shown in Fig. 1, parts being broken away.
Figures 4, 5:
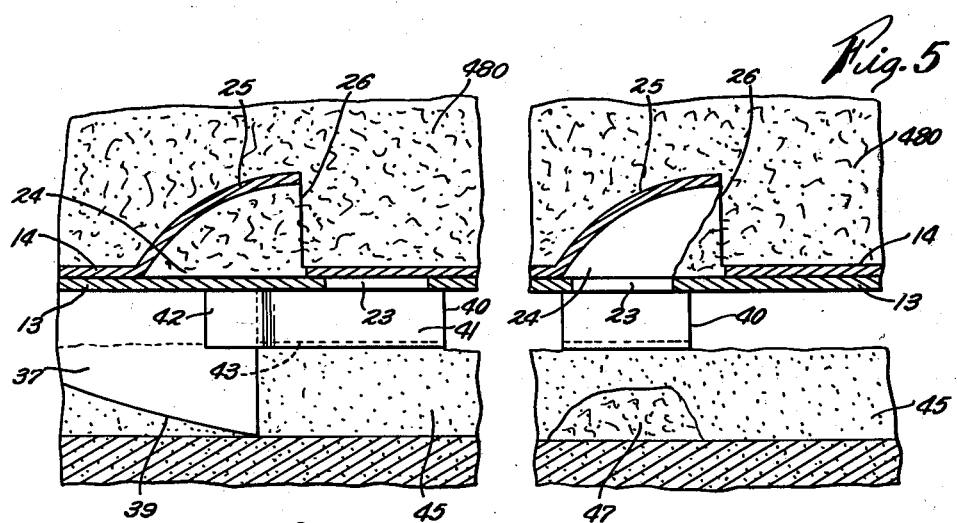
Fig. 4 is an enlarged section taken on line 4—4 of Fig. 3, illustrating one operative position of the fertilizer discharge means for my implement.
Fig. 5 is a sectional view similar to Fig. 4 showing another operative position of the discharge means.

The means for dispensing measured quantities of fertilizer from the hopper comprises a circular row of spaced openings 23 formed in the lowermost plate 13 of the bottom, and a circular row of spaced openings 24 stamped in the plate 14 (Fig. 2). There are preferably the same number of openings in each plate, and the row of openings in each plate are so positioned that they are capable of being brought into registry upon relative rotation of the plates to provide a plurality of discharge ports in the hopper bottom for dispensing fertilizer therefrom. As best shown in Figs. 4 and 5 the openings 24 in plate 14 are formed by stamping a scoop 25 of predetermined size therein, all of said scoops having a vertical opening 26 located on the same side with respect to one rotational direction of the plate.

Figure 3:
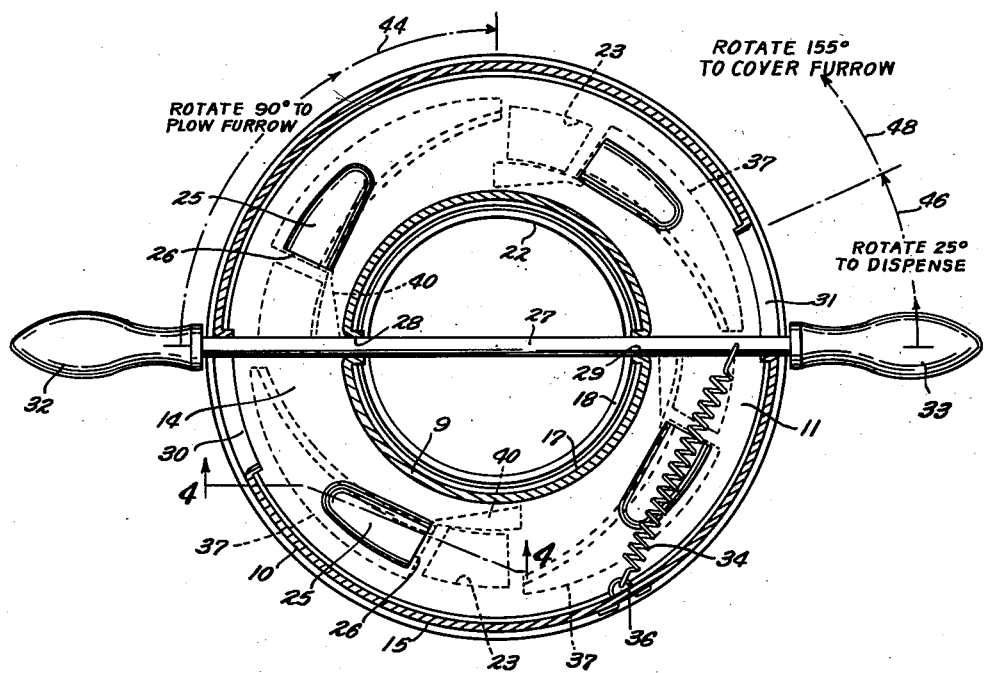
Fig. 3 is a section taken on line 3—3 of Fig. 1.

A horizontal operating arm 27 extends laterally through the upper ends of members 9 and 10, and, as shown in Figs. 1 and 3, the mid-portion of the arm passes through opposed holes 28 and 29 formed in the wall of the inner member 9, and both end portions of said arm pass through opposed, arcuate slots 30 and 31 formed in the wall of the outer member 10. The outer ends of this arm are each provided with handles 32 and 33 which preferably have central bores into which said ends are driven. A contractile spring 34 has one end hooked in an eye 35 formed in the operating arm and has its opposite end secured in a U-shaped clip 36 passed through a hole formed in the wall of the member 10. As best shown in Fig. 3, this spring biases the operating rod toward a normal inoperative position with its end portions situated in the ends of the arcuate slots whereby the rows of openings 23 and 24 are maintained in non-registered positions, while rotation of the rod 25° counterclockwise with respect to the outer member 10 positions the rod in the opposite ends of the slots to bring the said rows of openings into full registry to dispense fertilizer from the hopper.

The hopper bottom has depending therefrom a circular row of earth moving blades 37, said blades each having a mounting flange 38 formed on its upper end for welding or otherwise securing it to the underside of plate 13 between adjacent openings 13 therein. Each plate is preferably arcuately formed and is eccentrically arranged in the row such that one side of a blade terminates adjacent the outer corner of an opening 23 whilst the opposite side of said blade is positioned near the inner corner of an adjacent opening 23. Each blade has an inclined lower edge 39 which progressively deepens in the same rotational direction as the other blades in the row. The deepest side of each blade has extending therefrom a foot member 40 which is L-shaped in lateral section and has a vertical side wall 41 tangentially disposed with respect to the blade and which is inclined somewhat toward the center of the implement (Fig. 2). The foot member has a mounting flange 42 that is welded to the blade and has a horizontal web 43 extending outwardly from its lower edge which is adapted to contact the ground to limit the depth of the furrows cut therein by rotation of the blades 39 in the earth.

Having described the embodiment of my invention I shall now briefly describe its operation and special usage and in this respect I contemplate dispensing with my implement a chemical fertilizer carried in a mulch dispersant. The mulch which is to comprise the bulk of the fertilizer is previously soaked in a chemical plant food and is thereafter processed to a relatively dry condition. This mulch type chemical fertilizer is introduced into the hopper space 11 of my implement and the implement placed in operative position relative to a plant to be fertilized. This is accomplished by grasping handles 32—33 and lowering the implement over the plant until the plant is within the space 22 of the implement and the lowermost edge portions of the blades 37 are in contact with the earth at spaced points around said plant. A row of furrows is then formed in the earth around the plant by rotating the implement clockwise as indicated by the legend and arrow 44 in Fig. 3. This rotational movement through approximately 90° rotates the blades 37 horizontally through the soil and moves, but does not compact, the earth, to plow a circular row of furrows therein which are of a depth equal to the extension of the blades beneath the web 43 of the foot members 40.

It is now thought best to make these furrows about 1½″ deep and approximately ¾″ in width. Fig. 4 depicts the relative positions of the implement parts and one furrow 45 dug in the earth by the movement of an eccentric blade 37. Because of the eccentric position of the blades the earth moved by the blades to form the furrows is thrown inwardly to form arcuate piles of loose earth on the surface of the earth adjacent the inner edges of the furrows.

It will be noted that the rotational movement of my implement in the direction of the arrow forced the operating arm against the sides of the arcuate slots 30 and 31 which it is shown contacting in Fig. 3 whereby there would be no relative movement between the members 9 and 10 during the furrow forming operation. Upon completion of the above indicated movement, the handles are moved by the operator in the counter-clockwise direction indicated by the legend and arrow 46 in said Fig. 3. This movement of the arm results in the relative rotational movement of the members 9 and 10 through approximately 25° whereby the openings 23 and 24 in the plates 13 and 14 respectively are brought into alignment so that a measured quantity 47 of fertilizer 48 is discharged through said openings and deposited at the bottom of the furrow 45. It will be noted that the scoop picks up a quantity of fertilizer to just fill it and that its open vertical side is so positioned that it allows substantially all of the fertilizer in the scoop to be discharged and effectively precludes fertilizer from the hopper bottom from discharging through the opening.

The raking operation of the implement is a continuation of the fertilizer dispensing movement and is indicated by legend and arrow 48 in Fig. 3. In this action the inclined rakes 40 pass over the arcuate piles of earth heaped on the inside of the furrows by the furrow plowing operation and in so doing the rakes push the loose earth back into the furrow to cover the furrows and the fertilizer deposited therein. In this raking action the implement is gradually raised out of the ground and as the blades are made free of the ground, the spring 34 takes over to return the members 9 and 10 to their inoperative positions illustrated in Fig. 3 for the next fertilizing operation.

What is claimed is:

1. In a garden tool, a pair of relatively rotatable members arranged to provide a fertilizer hopper with spaced inner and outer side walls and a bottom wall comprising a pair of sliding plates each secured to a member, a circular row of spaced earth-moving blades mounted on said hopper edgewise to the hopper bottom wall, each of said blades being eccentrically positioned in the row, an operating arm fixed to one of the members and having a lost motion connection with the other member, each plate having a circular row of fertilizer discharge openings formed therein, said plates being normally positioned with the rows of openings in non-registered positions and brought into registry by relative movement of said members, said arm having movement in an arcuate path in one direction and countermovement in the opposite direction in the operation of the tool, said arm normally operatively connected with said other member in said one direction of movement to move the hopper and blades through the earth to form arcuate furrows therein, said lost motion connection providing for relative movement of said members during the initial part of said countermovement of said arm to bring the openings into registry.

2. In a device of the character described, the combination of an inner tubular member, an outer tubular member surrounding and relatively movable with respect to the inner member and forming therewith vertically extending walls of a fertilizer hopper, a plate secured to each member and positioned in overlapping sliding relationship to form a hopper bottom, each plate having a circular row of spaced openings formed therein, means normally positioning the plates with the openings thereof out of registry, said openings being brought into registry by relative movement of said members, a circular row of earth-moving blades mounted on the bottom and each depending therefrom between adjacent openings, each of said blades being disposed eccentrically in the row, a horizontal operating arm extending laterally through the upper portions of said members and having handle portions on its free ends, said arm being fixed in one member and having a lost motion connection with the other member, said arm having movement in an arcuate path in one direction and countermovement in the opposite direction in the operation of the device, said arm normally operatively connected with said other member in said one direction of movement to move the hopper and blades through the earth to form arcuate furrows therein, said lost motion connection providing for relative movement of said members during the initial part of said countermovement of said arm to bring the rows of openings in the plates into registry.

3. In a garden tool, an outer tubular member having an inturned annular plate fixed to its lower edge, a row of spaced earth-moving blades fixed to and depending from the bottom of said plate, and each blade being eccentrically positioned with respect to the center of the plate, said plate having a row of spaced discharge openings alternately positioned between the blades, an inner tubular member having an outwardly directed annular plate fixed to its lower edge and extending into overlapping sliding relationship with the first mentioned plate, and having formed therein a row of openings adapted for registry with the openings in the first mentioned plate to dispense fertilizer from the hopper, said members being relatively movable, an operating arm fixed to the inner member and having a lost motion connection with the outer member, means acting to normally hold the members and their associated plates in non-dispensing positions, and a raking foot mounted on one end of each blade, said arm having movement in an arcuate path in one direction and countermovement in the opposite direction in the operation of the tool, movement of said arm in said one direction serving to move the blades through the earth to form furrows therein, and countermovement of said arm causing each raking foot to move earth back into its associated furrow, said lost motion connection providing for relative movement between said members and plates during the initial part of said countermovement of the arm to place said openings in registry and dispensing positions.

WALTER V. HEEKIN.

References Cited in the file of this patent

UNITED STATES PATENTS

| Number | Name | Date |
|---|---|---|
| 39,560 | Fitts et al. | Aug. 18, 1863 |
| 633,244 | Labelle | Sept. 19, 1889 |
| 2,130,466 | Lapierre | Sept. 20, 1938 |
| 2,330,408 | Cover | Sept. 28, 1943 |